May 5, 1953
P. D. BECKER
2,637,462
CLOSURE MEMBER
Filed April 21, 1949
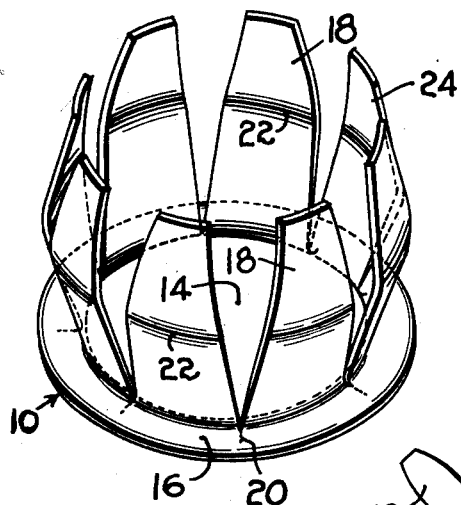
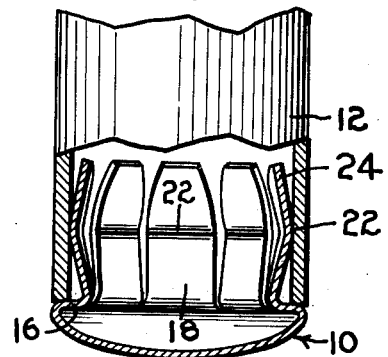
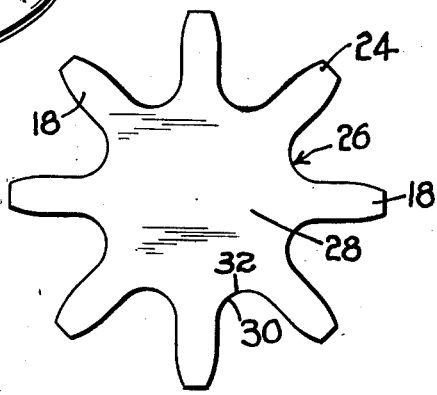
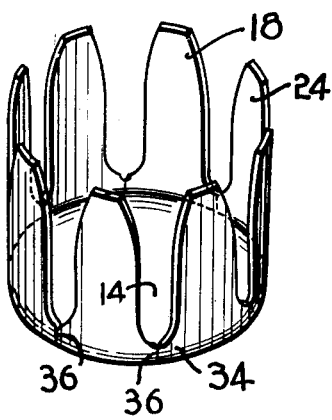
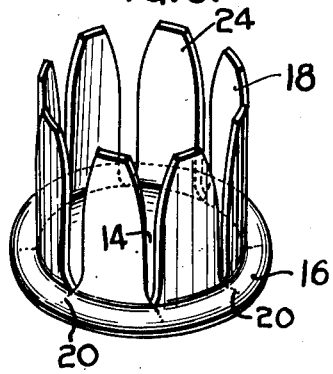
INVENTOR:
PHILIP D. BECKER,
BY John Todd
ATTORNEY.

Patented May 5, 1953

2,637,462

UNITED STATES PATENT OFFICE 2,637,462

CLOSURE MEMBER

Philip D. Becker, Hingham, Mass., assignor to United-Carr Fastener Corporation, Cambridge, Mass., a corporation of Massachusetts Application April 21, 1949, Serial No. 88,795

4 Claims. (Cl. 220—42)

1

This invention relates generally to closure members, and has particular reference to a closure member formed of sheet metal which is adapted to close the end of a pipe or the like.

Such members are ordinarily produced by pressing and drawing operations performed on a sheet metal blank, and comprise a base having an inwardly turned flange disposed about the periphery for seating against the pipe end, and a series of resilient legs integral with the flange and extending upwardly therefrom in a position substantially normal to the base. The legs are provided with shoulders for frictional engagement with the inner surface of the pipe, which are shaped and arranged to cause inward flexing of the legs when the member is assembled in the pipe. To obtain the engaging force required to retain the member in assembly therein, considerable flexing of the legs is necessary, and such flexing causes high stresses on the metal of the legs at the point where they join the flange. Unless such stresses are properly controlled, the metal will tend to fail at the outer edge of the bottom of the leg, where the stress is highest and where the metal has been weakened most by the forming operations used in producing the member. Such failure usually produces cracks which extend from both edges of the bottom of the leg into the flange and diagonally across the bottom of the leg, thus reducing the effective width of the leg where the stress is greatest, and thereby reducing the frictional engaging force of the shoulders.

The object of this invention is to provide an improved closure member for closing the ends of pipes and the like, in which pipe wall-engaging legs are so disposed thereon as to control stresses imparted to the bottom of the leg to prevent failure of the metal of the leg during flexing of the leg.

A further object of the invention is to provide a closure member for pipes and the like which is formed of a sheet metal base having legs extending upwardly therefrom, in which the legs are so disposed on the base as to allow flexing of the legs about the lower portion thereof without causing the formation of lines of weakness across the legs.

Other objects of the invention will, in part, be obvious, and will, in part, appear hereinafter. For a fuller understanding of the nature and objects of the invention, reference should be had to the following detailed description, taken in conjunction with the accompanying drawing, in which:

2

Fig. 1 is a view in perspective of the closure member of the invention;

Fig. 2 is a view in elevation, partly in section, of the closure member of Fig. 1 assembled in a pipe end;

Fig. 3 is a plan view of a sheet metal blank used in forming the closure member of Fig. 1;

Fig. 4 is a perspective view of a member resulting from a forming operation performed on the blank of Fig. 3; and Fig. 5 is a perspective view of a member resulting from a forming operation performed on the member of Fig. 4.

Referring to the drawing, there is illustrated a closure member 10, which is adapted to close the end of a pipe 12. The closure member 10 is preferably formed of a single piece of sheet metal, and comprises a base 14, the outer edge of which is turned inwardly to form a continuous inwardly extending flange 16, and a series of resilient legs 18 integral with the flange and extending upwardly therefrom. The legs 18 are spaced about the flange so that the lower portion of adjacent legs abut one another, and each leg is widened at the bottom, so that adjacent legs intersect at a sharp angle substantially at the point where they join the flange. A line of weakness 20, which is produced by the forming operations, is disposed in the flange between adjacent legs, and extends radially outwardly from the inner edge of the flange, for a purpose which will be hereinafter described. An outwardly extending shoulder portion 22 is provided on the legs for frictional engagement with the inner surface of the pipe 12 when the closure member is assembled therein, and the shoulder 22 is shaped and arranged to cause inward flexing of the legs 18 during such assembly. To facilitate insertion of the member into the pipe, an inwardly-extending guide portion 24 is provided on each leg beyond the shoulder portion.

The principal steps in the manufacture of the member is illustrated by Figs. 3, 4 and 5. A blank 26 is formed of sheet metal, and comprises a center portion 28, with the series of legs 18 extending radially outwardly therefrom. The legs 18 are originally spaced about the periphery of the center portion a predetermined distance apart, and have an outwardly rounded lower portion 30, which is shaped and arranged to cause adjacent legs to intersect in a smooth continuous curve, as at 32. The blank 26 is then subjected to a series of forming operations to produce the closure member of the invention. In a first operation, the legs 18 and a predetermined outer portion 34 of the center portion 28 is turned upwardly to a position substantially normal to the plane of the center portion. During this operation, the distance between the lower portion of adjacent legs is decreased, and the excess metal between the legs is forced together, producing a crack between adjacent legs as illustrated at 36 in Fig. 4. In a second operation the outer portion 34 is turned inwardly while maintaining the legs in the upwardly extending position, to form the continuous inwardly extending flange 16. This operation displaces the legs 18 inwardly sufficiently far to cause adjacent legs to abut at the point where they join the flange, and causes a line of weakness between adjacent legs to extend radially into the flange, as illustrated at 20 in Fig. 5. The forming operations partially cold weld the metal together so that any crack remaining is visible only under a microscope, but nevertheless a line of weakness remains. A final forming operation is then performed on the legs to produce the outwardly extending shoulder portion 22 and the guiding portion 24.

During flexing of the legs, formation of lines of weakness or cracks diagonally across the flange at the bottom of the legs or across the legs themselves is prevented by the design of the member at the point where the legs abut one another about the flange. By reason of the shape of the original blank, the forming operation first produces a crack midway between each leg by forcing together the excess metal as hereinbefore described, and this crack produces a line of weakness in the flange which remains after the subsequent forming operations. By reason of the presence of this line of weakness, stresses at the edge of the bottom of the legs do not tend to form diagonal lines of weakness or cracks which would reduce the effective width of the leg, but if any crack is formed, it tends to follow the line of weakness left from the forming operation. Since this line extends radially outward there is no weakening of the leg itself, and the frictional engaging force of the shoulder portion is not reduced. The principal advantage of the closure member of the invention is the stiffer action of the resilient legs, which retains the member in engagement with the pipe more securely than known closure members of this general type. Since the legs are able to withstand a greater amount of flexing without failure, closure member of the invention is not only capable of reuse a great number of times, but is also adapted for use in a greater variety of pipe sizes than previously known closure members.

Since certain obvious modifications may be made in the device without departing from the scope of the invention, it is intended that all matter contained herein be interpreted in an illustrative and not in a limiting sense.

I claim:

1. A closure member for closing an opening in a support, said closure member being formed of a single piece of sheet metal, and comprising a base, the outer periphery of the base being turned back on itself forming a continuous inwardly extending flange, a series of resilient support-engaging legs integral with the flange and extending upwardly therefrom, and a single line of weakness extending into the flange from between each adjacent pair of legs, said lines of weakness extending radially outward from the inner edge of the flange.

2. A closure member for closing an opening in a support, said closure member being formed of a single piece of sheet metal, and comprising a base having an inwardly turned outer periphery forming a continuous inwardly extending flange, a series of resilient support-engaging legs integral with the flange and extending upwardly therefrom, said legs being so spaced about the flange as to cause adjacent legs to abut at the point where the legs join the flange, and a single line of weakness extending into the flange from between each adjacent pair of legs, said lines of weakness extending radially outward from the inner edge of the flange.

3. A closure member for closing an opening in a support, said closure member being formed of a single piece of sheet metal, and comprising a base having an inwardly turned outer portion forming a continuous inwardly extending flange, a series of resilient support-engaging legs integral with the flange and extending upwardly therefrom, said legs being widened at the lower portion and being so spaced about the flange as to cause adjacent legs to abut at a sharp angle substantially at the point where the legs join the flange, and a single line of weakness extending into the flange from between each adjacent pair of legs, said lines of weakness extending radially outward from the inner edge of the flange.

4. A closure member for closing an opening in a support, said closure member being formed of a single piece of sheet metal and comprising a base, the outer periphery of said base being turned back on itself forming a continuous inwardly extending flange, a series of support-engaging legs integral with the flange and extending upwardly therefrom, said legs having an outwardly extending shoulder disposed thereon for engaging the inner surface of the support wall and being shaped and arranged to be inwardly flexed about the point where the leg joins the flange, said legs being widened at the portion adjacent the flange whereby adjacent legs intersect at a sharp angle substantially at the point where the legs join the flange, and a single line of weakness extending into the flange from between each adjacent pair of legs, said lines of weakness extending radially outward from the inner edge of the flange.

PHILIP D. BECKER.

References Cited in the file of this patent

UNITED STATES PATENTS

| Number | Name | Date |
|---|---|---|
| 996,511 | Oltsch | June 27, 1911 |
| 1,593,785 | Wilson | July 27, 1926 |
| 1,753,631 | Walters | Apr. 8, 1930 |
| 2,016,225 | BuKolt | Oct. 1, 1935 |
| 2,141,856 | Fabrice | Dec. 27, 1938 |
| 2,238,238 | Westrope | Apr. 15, 1941 |
| 2,390,072 | Beaton | Dec. 4, 1945 |
| 2,497,827 | Trafton | Feb. 14, 1950 |

FOREIGN PATENTS

| Number | Country | Date |
|---|---|---|
| 373,734 | France | May 25, 1907 |